April 3, 1951 W. POULIART 2,547,043

AUTOMATIC CONTROL OF SELECTORS BY REGISTER POTENTIAL MATCHING

Filed Feb. 14, 1947 4 Sheets-Sheet 1

INVENTOR.
WILLY POULIART
BY
Robert Harding Jr.
ATTORNEY

INVENTOR
WILLY POULIART
BY Robert Harding Jr.
ATTORNEY

INVENTOR.
WILLY POULIART
BY Robert Harding Jr.
ATTORNEY

April 3, 1951 W. POULIART 2,547,043

AUTOMATIC CONTROL OF SELECTORS BY REGISTER POTENTIAL MATCHING

Filed Feb. 14, 1947 4 Sheets-Sheet 4

INVENTOR.
WILLY POULIART
BY Robert Harding Jr.
ATTORNEY

Patented Apr. 3, 1951 2,547,043

UNITED STATES PATENT OFFICE 2,547,043

AUTOMATIC CONTROL OF SELECTORS BY REGISTER POTENTIAL MATCHING

Willy Pouliart, Antwerp, Belgium, assignor to International Standard Electric Corporation, New York, N. Y., a corporation of Delaware Application February 14, 1947, Serial No. 728,548
In the Netherlands March 13, 1942

Section 1, Public Law 690, August 8, 1946
Patent expires March 13, 1962

11 Claims. (Cl. 179—18)

This invention relates to new and useful improvements in automatic telecommunication systems in which selection is effected by means of single motion switches which are set to desired positions under the control of register circuits. It deals in particular with the so-called "group selecting" stage, i. e. a selecting stage where, in addition to the purely numerical selection, free hunting must take place in order to choose a free outlet in the group selected.

The means controlling the selectors from the register circuits comprise a detector or discriminator similar to that described in U. S. Patent No. 2,444,065 issued to applicant on June 29, 1948.

In the system herein disclosed, when the calling line dials the called number the register end of a signaling wire is connected to a predetermined direct current potential which is characteristic for the received digit. The selector is set in motion under control of the register and connects its end of the signaling wire to various direct current potentials marking the beginning and the end of groups of trunks or other outlets. The differences of potential thus connected to the signaling wire operate the register to determine in which part of the selector bank free hunting must take place, and thus directly control the selection.

The direct current which, at the selector end, indicates the beginning of a group of outlets, bears a predetermined relationship to the potential of the corresponding numerical indication connected at the register. The two potentials may be of the same sign and value or there may be a predetermined difference between them to cause a response of the detector.

According to a further characteristic of the invention, a first response of the detector indicates that hunting may be started, and the register end is connected to a check potential which is also associated with the desired numerical indication but differs from the potential marking the beginning of a wanted group sufficiently to prevent response by the detector.

According to another feature, the difference between direct current potentials at the selector end, with the exception of the one marking the beginning of a group, and the corresponding check potential may cause a second response of the detector before the selector has left its set position, thereby causing removal of the free hunting conditions. Such second response reverses the connections to the detector and applies to the register end of the signaling wire a potential which will cause a third response of the detector and the reestablishment of initial conditions. The selector connects its end of the signaling wires to another potential indicating that the selection process may be repeated, but this potential is of such value as to prevent a new response of the detector when the initial condition is reestablished.

It will be seen, therefore, that numerical selection and free hunting may be effected simultaneously, but then the designation as well as the busy or idle condition of the outlet must be possible at the same time. If, on the other hand, numerical selection and free hunting take place successively, then the identification of the group of outlets may be temporary to indicate that the selector has reached a position to hunt over outlets belonging to the desired groups. In the first case the relative position of the various outlets in the selector bank has no influence upon the process of selection, and these outlets may, therefore, be distributed over the selector bank in any suitable manner. However, in the second case, the relative positions of the various outlets are important, because if the beginning of free hunting is signaled, then its end must also be indicated in case no free outlet is found in the desired group. Special signals are required for this purpose, and the number of times the various signals will have to be repeated during a same selection thus depends on the method of grouping the outlets in the selector bank. It is advisable, therefore, not to connect the various outlets in a haphazard manner in the bank of the selector, but place together outlets to a given direction, and to reduce the number of groups as much as practicable.

The present invention employs the second case. The signaling arrangement described in my said patent permits an unlimited number of simultaneous selections controlled direct from the register. This is applied to the group selecting stage as follows:

The indications required to set the selector to a given position in accordance with a numerical indication received and stored in the register circuit, are sent over a signaling circuit linking the digit-storing apparatus in the register with the selector. A special detector in this circuit is adjusted to respond only to a predetermined minimum difference of potential. At the register end of the signaling circuit the various numerical indications are each represented by a direct current potential of a given value, while the other end of the circuit is connected by the moving selector to direct current potentials marking the beginning and the end of every group of outlets.

In order to use the above arrangement as a means of identifying a wanted group of outlets, the magnitudes of the various potentials must fulfill the following conditions:

1. The difference between the potential applied at the selector and the potential applied at the register must be constant in value and sign.

2. Among all the direct current potentials which may be connected at the selector only the one marking the beginning of the wanted group may present, with respect to the potential applied at the register, the value defined by condition 1.

The first of the above conditions insures the possibility of identifying the wanted group or groups, and the second complements the first by eliminating the possibility of a false identification.

The signal receiver must be adapted to distinguish the fixed difference of potential defined by condition 1 from any other difference of potential. The detector of the present invention distinguishes only between two classes of potentials applied at the selector end:

(*a*) Those which present, with respect to the potential connected at the register, a difference of wrong sign or insufficient value to cause the response of the detector; and (*b*) Those which under the same conditions cause a response of the detector and which comprise, first the potential presenting the minimum difference of required value and sign to operate the detector, and second those presenting a higher difference, but in the correct direction.

If for a given numerical indication in the register the minimum operating potential is the same as that used to mark the beginning of the wanted group, i.e. the fixed difference previously defined exists, then a complete means of identification can be obtained by associating with the detector an arrangement whereby that minimum operating potential can be distinguished from the other operating potentials.

In the present system this necessary discrimination is attained by introducing such circuit conditions immediately after a first response of the detector that, while the selector remains in the same position, the register end of the signaling wire is connected to a new potential representing the numerical indication received and termed "check potential" in order to distinguish it from the original potential representing the numerical indication received. The value of this check potential is so chosen, that it is insufficient to cause a second response of the detector only in the case the first response was caused by the minimum operating potential.

The problem of identifying the beginning of a wanted group is thus solved, provided that the first response of the detector be taken as an indication that free hunting may be started, and a second response as an indication that free hunting must not take place, thus canceling the effect of the first response. By delaying slightly the moment at which free hunting becomes effective after a first response, it is possible to render the free hunting inoperative between the successive responses of the detector which occur when the selector reaches a position marked by a higher potential than the minimum operating potential. Thus the selector position marking the beginning of a group need not necessarily precede the group, but may correspond to the position occupied by the first outlet.

The second part of the selection problem, which consists in canceling the free hunting condition if the selector reaches the end of a wanted group after unsuccessful hunting, is automatically solved by causing a second response of the detector at the required moment, the circuit arrangement being such that the second response removes free hunting conditions. For this second response, it is sufficient to mark the end of the group by an operating potential higher than the minimum.

Up to this point the system guarantees that no erroneous selection can take place, but it does not provide a complete solution of the selection problem, because it does not cover the necessary reintroduction of the free hunting operation in case there are several groups of outlets leading in the wanted direction, or if all the outlets in the wanted direction are busy, or if the detector has already responded twice before the selector reaches the wanted group.

In order to repeat the free hunting operation, the circuit conditions existing before the first response of the detector should be reestablished in the register after a second response. It is obvious that the second response itself cannot be used to achieve this purpose, because the detector would immediately respond again, twice in succession in the same position of the selector, the potential marking the end of the group being higher than the minimum operating potential with respect to the potential representing the numerical indication received. The cycle of responses would thus renew itself perpetually, the selector remaining in the meantime in the same position.

The circuit conditions must be so modified that a third response of the detector may take place bringing about the reintroduction of the initial condition. The register and the selector potentials required to cause this third response must satisfy the following conditions:

(*a*) The potential applied to the register end of the signaling wire after the second response must not cause this third response as long as the selector end is connected to the potential marking the end of the group.

(*b*) The potential marking at the selector end the reestablishment of initial condition must cause the response of the detector when the register end is connected to the potential defined by (*a*), but (*c*) It must not cause two successive responses after the reestablishment of the initial condition otherwise, the cycle of responses would renew itself continuously and the selector remain in the same position.

(*d*) It may cause a single response of the detector after the reestablishment of the initial condition only in the special case where it precedes a group whose beginning is marked by an operating potential with respect to that representing the numerical indication received. In such a case the response of the detector cannot cause a wrong selection.

The above conditions can only be fulfilled by reversing the connections to the detector after the second response. Since the potential defined by (*a*) presents a non-operating difference with respect to the potential marking the end of the group, the potential marking the reestablishment of initial conditions would have to be higher than that marking the end of the group and thus cause the third response of the detector in accordance with conditions (*b*). However, this would not satisfy condition (*c*). By reversing the connections to the detector after the second response the contradiction between conditions (*b*) and (*c*) is removed.

It will be understood, of course, that the relative magnitudes of the various potentials used, the number or size of the outlet groups, the order in which they are connected to the selector bank may be varied to suit specific requirements.

In accordance with the present invention three direct current potentials are used in the register, viz.: the characteristic potential, the check potential and the potential required for the reestablishment of initial conditions. Similarly, three direct current potentials are used at the selector side, namely: the potential marking the beginning of a group, that marking the end of a group, and that marking the reestablishment of initial conditions when the group has been passed over. A given value of direct current potential can be used for a plurality of purposes, provided that the conditions governing the magnitudes of the potentials are satisfied. In the same way, a given marking position on the selector may be associated with more than one group, provided that the direct current potential connected to that position fulfills its corresponding functions correctly with respect to each of the groups with which it is associated.

The invention will be better understood from the following detailed description as applied to the drawings, in which.

Figure 1:
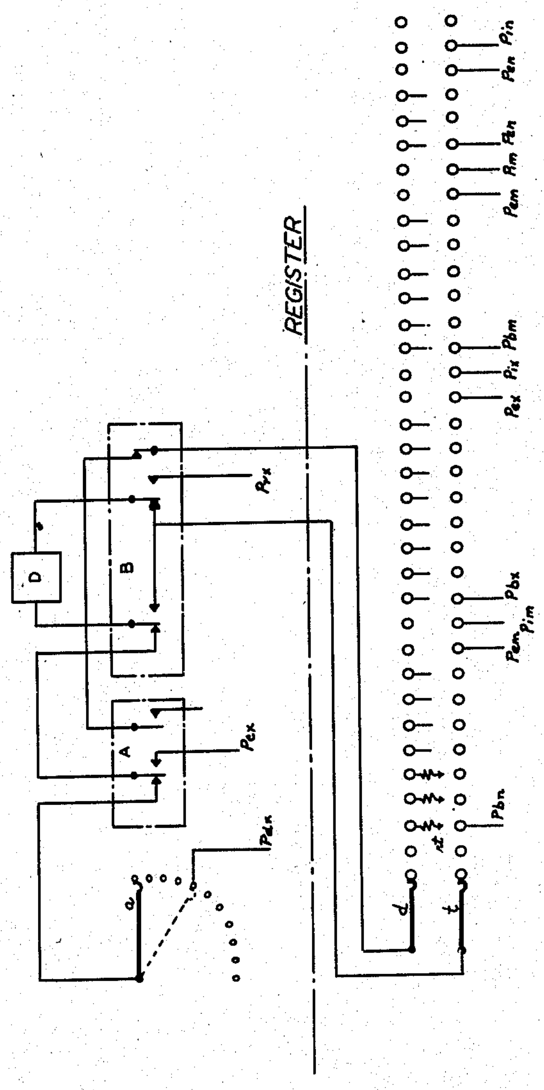
Fig. 1 shows part of a register and of the arc of a group selector, illustrating in a schematic way the principles in the method of selections.

Referring to Fig. 1, the signaling wire is connected to brush *a* of a digit receiving switch in the register and thus becomes connected, after reception of the digit, to the potential characterizing or representing the digit received. The other end of the signaling wire is connected to brush *t* of the selector and the direct current marking potentials are connected to the corresponding bank of *t* terminals.

D is the detector or discriminator inserted in the signaling wire and contact groups A and B modify the circuit conditions after the first and the second response of the detector. The third response restores both sets of contacts to their original positions.

Wire I gives access to the apparatus controlling free hunting and passes over contacts of the A and B groups to the *d* brush of the selector which performs the free hunting. The free outlets are characterized by the presence on the corresponding *d* terminal of a direct current potential connected via a resistance $r_t$. This potential is either removed or lowered by a connection to ground when the corresponding outlet is busy.

P*b* represents, in general, the potential connected to the *t* terminal representing the beginning of a group of outlets. This terminal may be the first outlet of the group.

P*e* represents the potential marking the end of the group, and is connected after the last outlet of the group.

P*i* is the potential connected in the bank of *t* terminals past Pe and marks the position where initial conditions must be reestablished in the register when free hunting stops.

P*d* is the potential applied at the register end of the signaling wire corresponding to the numerical indication received.

Pc is the check potential.

P*r* is the potential connected to the register end of the signaling wire after the second response of the detector.

The various potentials having similar functions will have the same designations but will have the subscript *x* for the wanted group and *n* in unwanted groups if lower than *x*, and *m* if higher than *x*.

If Vo represents the minimum difference of potential having the correct sign to operate the detector, then the various potentials must fulfill the following conditions to prevent false selection.

A. (1) $Pb_x - Pd_x \geqq Vo$
   (2) $Pb_x - Pc_x < Vo$
   (3) $Pe_x - Pc_x \geqslant Vo$
   (4) $Pr_x - Pe_x < Vo$
   (5) $Pr_x - Pi_x \geqslant Vo$
   (6) $Pi_x - Pd_x < Vo$ B. (1) $Pb_n - Pd_x < Vo$
   (2) $Pe_n - Pd_x < Vo$
   (3) $Pi_n - Pd_x < Vo$ C. (1) $Pd_n - Pd_x < Vo$
   (2) $Pe_m - Pd_x > Vo$
   (3) $Pe_m - Po_x \geqslant Vo$
   (4) $Pr_x - Pe_m < Vo$
   (5) $Pr_x - Pi_n \geqslant Vo$
   (6) $Pi_n - Pd_x < Vo$ D. (1) $Pb_m - Pd_x \geqslant Vo$
   (2) $Pb_m - Pc_x > Vo$
   (3) $Pe_m - Pc_x > Vo$
   (4) $Pr_x - Pe_m < Vo$
   (5) $Pr_x - Pi_n \geqslant Vo$
   (6) $Pi_n - Pd_x < Vo$ In the particular case of a potential P*i* preceding a potential $Pb_m$ or the potential $Pb_x$:

E. (1) $Pi - Pd_x \leqq Vo$

Conditions A correspond to the wanted group and groups B, C and D give the relative magnitudes of the potentials used for marking unwanted groups which will react differently upon the detector without, however, causing a false identification.

When the digit receiving switch connects potential $Pd_x$ to the register end of the signaling wire and the selector encounters potential $Pb_x$ the detector responds in accordance with condition A (1) and the armatures of contact group A are moved. The detector is then subjected to the difference of potential $Pb_x - Po_x$ and, at the same time, brush *d* of the selector is through-connected to the equipment controlling free hunting. In accordance with condition A (2), the detector does not respond again, whereby the A group of contacts remain operated while the B group is not operated. Free hunting may proceed. The register checks over wire I whether the outlet on which the selector is standing is free or not and, in the latter case, the selector continues to hunt until a free outlet is encountered in the group. The selector is then stopped, the corresponding outlet is seized, and the selection process is ended. If no free outlet is found in the group and the selector encounters potential $Pe_x$ after the last outlet of the group has been tested, condition A (3) indicates that the detector responds again; the armatures B are then operated with the result that the connections to the detector are reversed while the register end of the signaling wire is connected to the potential $Pr_x$. Condition A (4) indicates that, at that moment, the detector cannot respond under the influence of potential $Pe_x$, and condition A (5) indicates that it will respond when the potential $Pi_x$ marking the end of the group is encountered. The last condition, A (6), indicates that, when initial conditions are reestablished the detector cannot respond.

Conditions B represent the unwanted groups over which the selector brushes will pass without causing any response of the detector since all the differences of potentials to which the detector may become subjected remain below the required minimum. The potentials $Pc_x$ and $Pr_x$ cannot be now applied, because they are connected to the register end of the signaling wire only after a first response.

Under conditions C the potential marking the beginning of the group will not cause the response of the detector in accordance with C (1), but only in accordance with C (2). In this case, a wrong identification is avoided by condition C (3) which produces a second response immediately after the first. Conditions C (4), (5) and (6) guarantee the correct reestablishment of the initial conditions.

In a similar manner, conditions D fix the magnitudes of the potentials for unwanted groups in which the wire marking the beginning of the group causes the response of the detector.

Condition E (1) indicates that an eventual single response due to a potential $Pi$ after reestablishment of initial conditions, cannot cause a false selection if potential $Pi$ precedes the wanted group or a group of which the beginning is marked by a potential capable of causing a second response.

Figure 2:
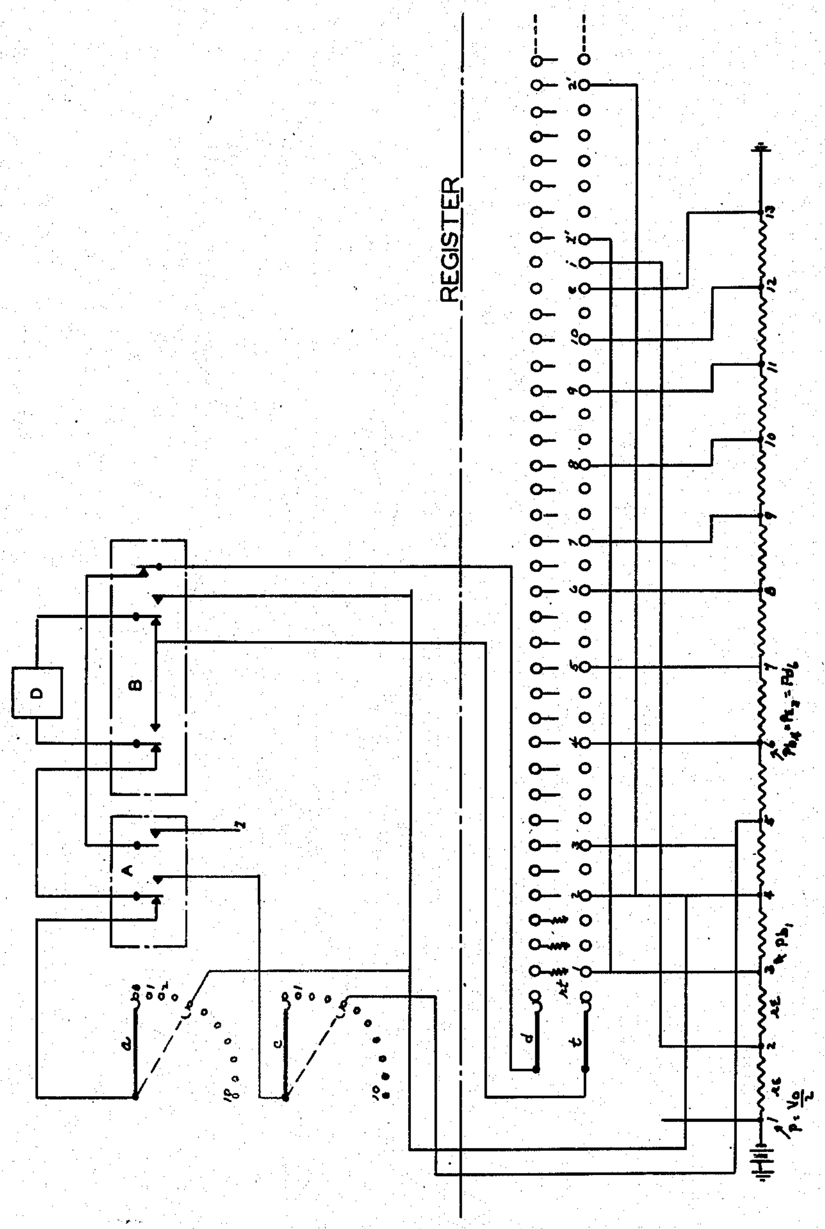
Fig. 2 shows the same parts for an alternative solution.

When the above-mentioned relationships exist for any of the potentials $Pd$ which represent a numerical indication received at the register, then the selection system will be satisfactory. However, the total number of different potentials required as well as the total number of points which have to be marked at the selector may be greatly reduced. The following example gives one such solution among the several possibilities, and is illustrated by Figure 2.

*Characteristic and check potentials in the register*

Conditions A (2) and D (2) indicate that $$Pb_x - Vo < Pc_x \leq Pb_m - Vo$$

Thus, in accordance with condition A (1) this may be written (a) $$Pd_x < Pc_x \leqslant Pd_m$$

This relation indicates in a general manner that the value of $Pc_x$ must be comprised between the value $Pd_x$ of the potential characterizing the numercial indication received, and the smallest potential of higher value than $Pd_x$ used to characterize another numerical indication. The check potential $Pc$ must, therefore, also be individual to the numerical indication received and a different check potential $Pc$ must be associated with each different $Pd$ potential. Fig. 2 shows that the $Pc$ potential is also connected via an arc of the digit receiving switch.

Furthermore, if in the above relation (a) $Pd_m$ is the smallest characteristic potential having a higher value than $Pd_x$ and which may be designated, for instance, by $Pd_{x+1}$, then for that particular value relation (a) is fulfilled if (b) $$Pc_x = Pd_{x+1}$$

Thus, the check potential corresponding to a given numerical indication may be used as characteristic potential of another numerical indication, and, if the various characteristic and check potentials used are indexed 1, 2, 3 . . . in the order of their magnitudes (c) $$Pd_1 < Pc_1 = Pd_2 < Pc_2 = Pd_3 < \ldots Pc_9 = Pd_{10} < Pc_{10}$$

and for ten different numerical indications which may be received in the register, only eleven different potentials are required in the register.

Conditions (c) may, in particular, be fulfilled by taking for the differences $Pd_2 - Pd_1$, $Pd_3 - Pd_2$, $Pd_4 - Pd_3$, etc., a fixed difference of potential $p$ which can thus be obtained by tappings off consecutive cells of a battery or off a potentiometer between the consecutive tappings of which the resistance has a fixed value.

*Potentials marking the beginning and end of groups*

In the same manner as for the characteristic and check potentials, the number of potentials required to mark the beginning and the end of groups may be reduced as explained hereafter.

If, in relation A (3), the particular value of $Pe_x$ is chosen to remove the inequality, then A (3) becomes $Pe_x - Pc_x = Vo$, if the characteristic and check potentials are chosen as has been explained above, then $Pc_x$ may be replaced by $Pd_{x+1}$ and A (3) becomes (d) $$Pe_x - Pd_{x+1} = Vo$$

By definition, the difference of potential Vo being that particular value which is required for identifying a group, $Pb_{x+1} - Pd_{x+1} = Vo$, this being the fundamental Equation A (3) applied to the group $x+1$. Therefore, $Pe_x = Pb_{x+1}$.

Thus, if the characteristic and check potentials are chosen as stated in (c) the potential marking the end of the group corresponding to the characteristic potential $Pd_x$, is the same as that marking the beginning of the group corresponding to the characteristic potential $Pd_{x+1}$.

In the general case it has been supposed that the terminals to which potentials $Pe_x$ and $PB_{x+1}$ are connected are different, but if the group $x+1$ follows the group $x$ in the selector bank, then the same terminal may be used and no position need be lost in the selector bank since the terminal in question fulfills the conditions that it follows the last outlet of group $x$ and coincides with the first outlet of group $x+1$. Thus, if the selector gives access to ten different directions and a series of ten groups of outlets follow each other in such a manner that the marking potentials are encountered in the increasing order of their magnitudes, only eleven different marking potentials and eleven corresponding terminals are required in the selector bank. The differences $Pb_2 - Pb_1$, $Pb_3 - Pb_2$, etc., will also each be equal to $p$ if the differences $Pd_2 - Pd_1$, $Pd_3 - Pd_2$, etc. equal $p$.

No relationship has as yet been established between the relative magnitudes of the register and selector applied potentials, and thus the total number of different D. C. potential values required is not fixed. But, if for instance $p$ is taken to equal Vo, then the total number of different potentials required is only twelve because $$Pb_1 = Pd_2,\ Pb_2 = Pd_3 \ldots Pb_{10} = Pd_{10} + p$$

and $Pe_{10} = Pd_{10+2p}$.

In that case relation A (2) becomes $$Pb_x - Pc_x = 0$$

indicating that non-operating limits for the detector need not be taken into consideration. The condition $p=Vo$, however, implies that the ratio between the minimum operating voltage Vo of the detector and the total voltage required for marking purposes is minimum, and for ten directions, for instance, Vo could not be taken higher than $^1/_{11}$ of the total voltage used for marking purposes.

It may, therefore, be of interest, in order not to have to use too sensitive a detector or too high a voltage for marking purposes, to consider another relationship between $p$ and Vo. If, for example, $p$ is taken to equal $Vo/2$, then the fundamental relation $Pb_x-Pd_x=2p$ indicates that $Pb_1=Pd_3$, $Pb_2=Pd_4$, etc., and that $Pb_{10}=Pd_{10}+2p$ and $Pe_{10}=Pd_{10}+3p$; thus a total of thirteen different potentials will be required. In this case, however, the non-operating conditions of the detector may be such that it does not respond to a difference of potential equal to $Vo/2$. The advantage of this second alternative is, that the sensitivity of the detector need not be as high as that required in the first alternative since Vo may equal $^1/_6$ of the total voltage required for marking purposes. Any other relationship between Vo and $p$ may be chosen, but the higher the minimum operating voltage of the detector becomes with regard to the total voltage used, the higher becomes the number of different potentials required and the narrower become the limits for the non-operation of the detector.

*Potentials used for indicating the reestablishment of initial conditions*

It can be seen from the relations A, B, C and D that any values of the potentials Pr and Pi which fulfill the requirements $Pr-Pi \geqslant Vo$ and $$Pi-Pd_1<Vo$$

can be used because they fulfill conditions A, C, D (6) for any numerical indication received. Thus, in the register, a common potential Pr may be used for preparing the reestablishment of initial conditions no matter what numerical indication is received, whereas at the selector end the same potential Pi may be used, no matter after which group in the selector bank it is connected.

It is not necessary to reestablish initial conditions after each group. In a system based on the foregoing example where the marking potentials for a series of outlet groups are connected in the selector arc in the increasing order of their magnitudes, when the detector responds for a second time and reverses the connections, such a potential Pr may be chosen that all the potentials higher than the one marking the beginning of the wanted group have no longer any effect on the detector. Since groups marked by such potentials are not wanted groups, the selector may rotate until it passes over the highest marking potential used, that is, the potential marking the end of the last group in the series, and it is not until the selector has left this position that initial conditions need be reestablished. It is, therefore, only necessary to reserve one position for the connection of the Pi potential for each series of outlet groups marked as above described. This position separates consecutive series of outlet groups but cannot correspond to the position of an outlet in case Pi is different from the $Pb_1$ potential of the following group as shown in Fig. 2.

If, however, the value of Pi is chosen so that $Pi=Pb_1$ in accordance with condition E (1), then the position and potential used for marking the reintroduction of initial conditions may be of the same as those marking the beginning of the first group.

In conclusion, if the various marking potentials are suitably chosen, as described above, then the whole system of selection requires only two more potentials than the total number of different directions to which the selector gives access, and all positions used for marking may correspond to outlet positions, except the one marking the end of the last group of a series. In particular, if all outlets to a same direction are concentrated into single groups forming thus only one series, then only one position is required in the selector bank which does not coincide with an outlet. A further advantage is that, the number of responses of the detector during a selection is reduced to a minimum. This is so, because in the case of a normal selection, the detector will respond only once, and in case a selector is unsuccessful in seizing a free outlet, the detector will respond only three times for every revolution of the selector brushes.

In addition to the features described heretofore, the present method of selection also allows the introduction of the "chasing" feature to gain time by allowing the selector to rotate while the corresponding digit is being received in the register, instead of waiting for the complete reception of the digit before starting the selection.

In order to introduce this feature in the present system of selection, it is necessary that the selector should start from a home position, and that the characteristic potentials connected to the different positions of the digit receiving switch in the register should follow the order observed in the selector bank.

The selector must be prevented from reaching a test position and stopping prematurely in that position merely because the digit switch in the register happens to be in the corresponding position which, however, is not the desired position. To this end, either the first stopping position of the selector must be sufficiently removed from the home position to prevent the selector from catching up with the digit receiving switch, or the rotation of the selector must be delayed until the digit switch occupies a position to which the selector will not be able to catch up while the remainder of the digit is being received. The first solution was usually adopted in old marking systems, but is not applied in the present system because all outlets of a given direction must be followed by a test potential presenting a higher potential than the preceding test potential. Furthermore, all test potentials must be connected from the home position onward in increasing order, or vice versa. Therefore, the first test potential connected in the bank after the home position must correspond to the beginning of the first group of outlets and cannot be preceded by other outlets of a group corresponding to a higher digit. If the potentials were shifted upward on the selector arc in order to prevent the selector from catching up with the digit receiving switch in the register, then all terminals preceding the test terminal would be lost.

The second solution, however, can easily be applied to the present system and does not entail the loss of any terminals in the selector bank.

All the foregoing considerations will best be understood by a practical example showing an application of my system to the first selection stage of a three-digit dialing P. A. B. X. In this example, a total of thirteen different potentials are used for selecting in ten different directions or trunk groups.

Figure 3:
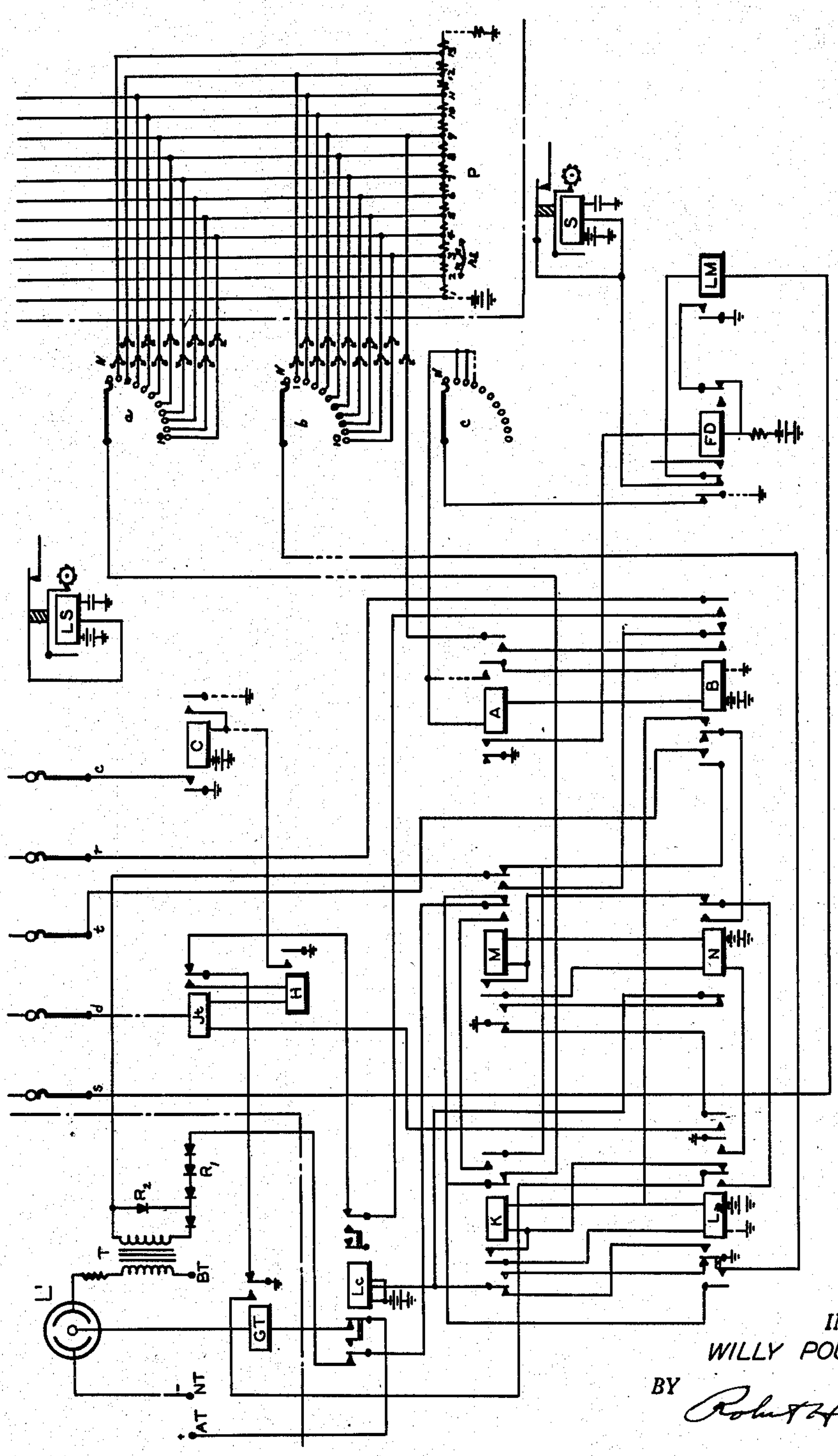
Fig. 3 illustrates part of a register circuit, as far as required for explaining the present invention.
Figure 4:
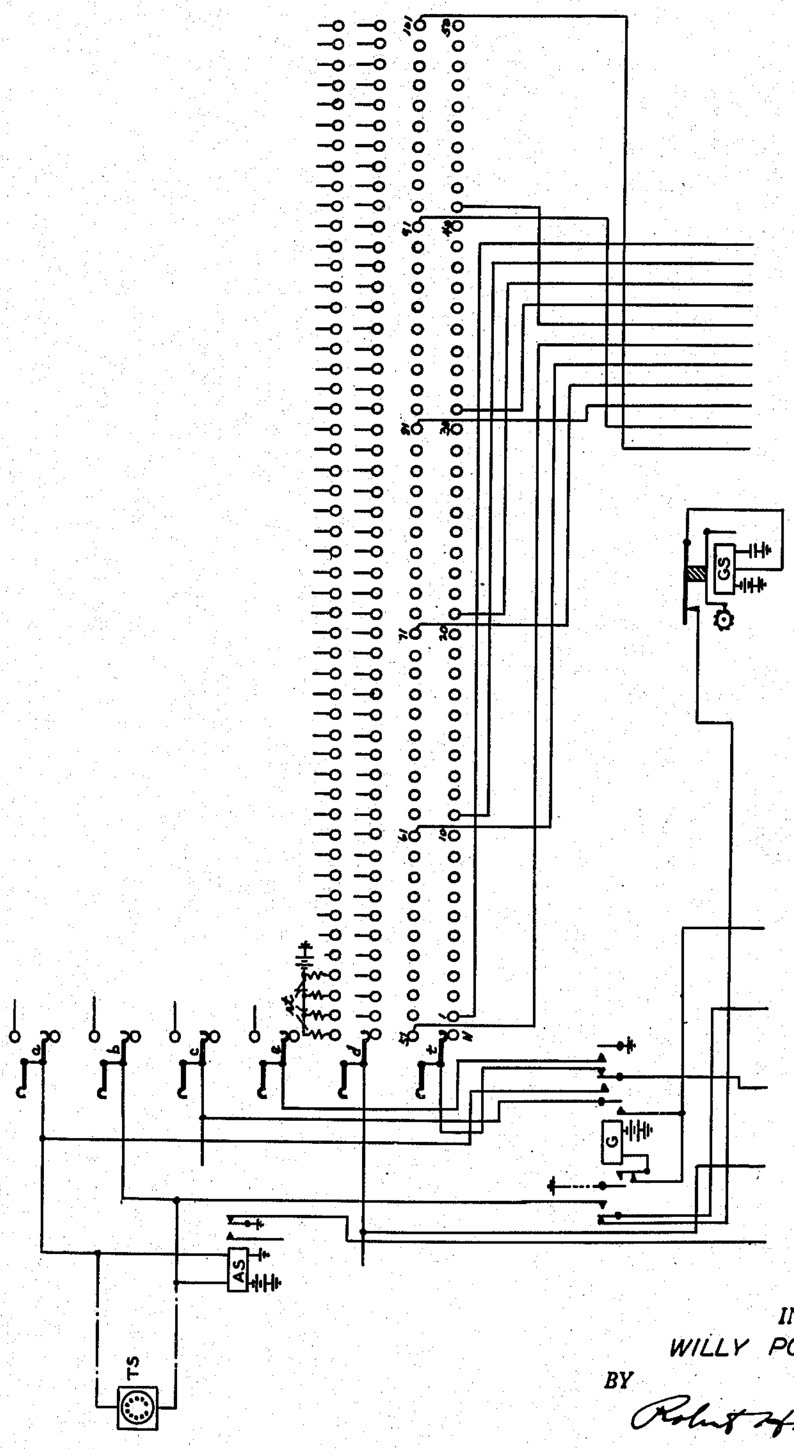
Fig. 4 shows the associated link circuit.

Fig. 3 shows the important parts of the register circuit required during the reception of the first digit and the corresponding group selection. Fig. 4 shows the important elements of the link circuit and of the group selector and its associated relay.

In Fig. 3 LS represents the power magnet of the link chooser having brushes *d*, *t*, *r* and *c*. The dial impulses received by the link stepping relay are transmitted to the register over brush *s*. The signaling for numerical selection is effected over brush *t*, the test for a free outlet in the required group is effected over brush *d*, the control of the power magnet of the selector is over brush *r*, and the selected outlet is seized over brush *c*.

S represents the power magnet of the digit receiving switch of which three arcs and corresponding brush members *a*, *b* and *c* are shown.

A, B and F*d* are three relays cooperating in the reception of the digit. Relay A marks the beginning of the reception of the digit, relay B the moment at which the selector may start rotating, and relay F*d* the end of reception of the digit.

L*m* is a slow relay which always energizes in series with the power magnet of the digit receiving switch and remains energized until the end of the train of impulses.

K and L are two relays indicating the first response of the test detector during the corresponding selection.

M and N are relays indicating the second response of the test detector in case the selector stops for the first time on a wrong test potential wire, or passes over a further test potential wire because no free outlet is found in the required group.

L*c* is a relay controlling the anode circuit of a cold cathode tube in the test detector and also the primary circuit of the detector transformer. Its functions are to extinguish the cold cathode tube after each response of the detector, and to prevent the primary circuit of the surge transformer from being closed before the anode circuit is reclosed.

J*t* and H are the usual test and helping relay for direct current double test.

C performs the functions of relay A in the reception of the next digit.

P is the common potentiometer providing the potentials representing the digits received in the regist:r and the stopping positions of the selector.

The test detector is like that described in my said patent and comprises a cold cathode tube L with biased control electrode, a surge transformer T with associated rectifiers $R_1$, $R_2$ and an anode relay G*t*. AT is the anode potential, NT the cathode potential and BT bias potential terminals.

In Fig. 4 TS represents the calling subscriber's telephone set. A*s* is the combined supervisory and stepping relay to which the calling subscriber's set becomes connected over a line finder and various groups of relay contacts in the link circuit, not represented on the drawing as they have no direct bearing on the circuit operation for selection. GS is the power magnet of the group selector having brushes *a*, *b*, *c*, *e*, *d*, and *t*. The terminal bank with which brush *t* cooperates is the one to which the test potentials required for numerical selection are connected. The terminal bank engaged by brush *d* is the one where the direct current test potentials for free hunting are connected over resistances *rt*. G is a relay energizing at the end of the group selection and switches the necessary signaling and control wires from the register to the group selector brushes over which the signaling for the next selection stage is effected.

The detailed operation of the circuits shown in Figs. 3 and 4 is as follows:

The dialing of the group selection digit produces successive releases of relay A*s* causing the digit switch S in the register to make the same number of steps as the number of impulses dialed. This circuit is traced as follows:

(1) Battery, winding of switch S, left inner break contact of relay F*d*, winding of relay L*m* brush and terminal *s* of the link chooser, (Fig. 3) break contact of relay A*s* to ground (Fig. 4).

Relay L*m* energizes during the first impulse and remains up until the end of the train of impulses.

When the digit receiving switch reaches position 1, relay A energizes in series with the left hand winding of relay B:

(2) Battery, left hand winding of relay B, winding of relay A, terminal and brush *c* of switch S, left outer break contact of relay F*d*, to ground.

Under these conditions relay B does not receive enough current to energize it, but relay A, once operated, prepares a locking circuit in series with the right hand winding of relay B so that the latter will operate as soon as the operating ground for relay A is removed.

Via its left make contact, relay A prepares a circuit for the energization of relay F*d* but the latter remains short-circuited via the make contact of relay L*m* until the end of reception of the digit.

When, at the end of reception of the impulse train, relay L*m* de-energizes, relay F*d* operates and thereby introduces the conditions necessary for receiving the next impulse train on another digit receiving switch. If the digit received is such that during its reception circuit (2) remains closed over brush and arc *c* of switch S, then relay B does not energize until ground disappears at the left outer break contact of relay F*d* at the end of the train of impulses. If, however, the digit received is such that circuit (2) is opened during its reception at brush and arc *c* of switch S, then relay B energizes before the end of reception of the digit.

The operation of relay B indicates that selection may start, and this relay has the necessary contacts for controlling the rotating of the selector and for closing the signaling wire over which numerical selection is controlled.

The following features of the selection will now be described: chasing, normal test, false test, continuous hunting.

*Chasing*

The selection begins when the group selector GS starts rotating upon the energization of relay B. In order to prevent the group selector from catching up with the digit receiving switch in the register, a delay is introduced between the beginning of the reception of the impulse train and the beginning of the rotation of the group selector. This delay may be fixed at will by maintaining the operating circuit for relay A closed for a sufficient length of time, thereby preventing relay B from energizing. As shown in the drawing, this is insured by strapping together on arc $c$ of switch S the required number of terminals.

The delay between the beginning of reception and the beginning of selection depends, of course, on the speeds of both the selector and the digit receiving switches, and the separation between the first terminals of the consecutive groups. Assuming that the digit-receiving switch may advance at a minimum speed of eight steps per second (minimum dial speed), that the selector may have a maximum free rotation speed of 80 steps per second, and that each group in the selector bank comprises ten terminals, then it will be sufficient to delay the operation of relay B during the first impulse of the train, as shown in full lines on the drawing, since one step of the digit receiving switch is equivalent in time to ten steps of the selector.

As soon as circuit (2) for the energization of relay A is opened, the latter is held in series with relay B, which energizes; a circuit for rotating the selector is then closed as follows:

(3) Battery, winding of GS, interrupter of GS, left outer break contact of relay G, terminal and brush $r$ of LS, right outer make contact of relay B, right outer break contact of relay Lc, break contact of relay $Jt$, break contact of relay $Gt$ to ground.

At the same time the test circuit is prepared as follows:

(4) Arc and brush $a$ of switch S, right break contact of relay K, right break contact of relay M, left outer break contact of relay Lc, rectifiers $R_1$ and primary winding of transformer T, right outer break contact of relay M, left outer make contact of relay B, brush and terminal $t$ of LS, right break contact of relay G and brush $t$ of the selector switch.

As long as the digit has not been completely received, the test detector cannot respond owing to the delay in the starting of the group selector. At the end of reception of the digit, when switch S occupies the position corresponding to the digit received, the test circuit will be completed.

In the example shown the range of potentials required for selection is supplied by potentiometer P made up of elementary resistances $r_e$ placed in series, the number of resistances used being such that the voltage drop $p$ across one elementary resistance is smaller than the potential difference required to operate the test detector, but the voltage drop $2p$ across two consecutive elementary resistances corresponds to the minimum difference of potential required.

The connection of the primary circuit and associated rectifiers of the surge coil is such, that the potential applied to the brush of the selector must be negative with respect to the potential applied to brush $a$ of the digit receiving switch. Assuming that digit 6 has been received in the register and that switch S is standing in position 6, brush $a$ of the digit receiving switch is subjected to the potential corresponding to point 8 of the potentiometer and the test detector will respond at the moment the test brush of the group selector encounters the test potential wire connected to point 6 of the potentiometer. Terminal 51 of the group selector represents the beginning of the group of outlets designated by digit 6.

*Normal test*

When the selector reaches terminal 51 the test detector operates and the anode relay $Gt$ energizes. $Gt$ removes, at its break contact, the ground from circuit (3), and via its make contact closes a circuit for the energization of relay K:

(5) Battery, right-hand winding of relay L, winding of relay K, right break contact of relay L, make contact of relay $Gt$, to ground.

Relay K energizes and prepares its holding circuit in series with the left-hand winding of relay L. Relay L, however, does not yet energize.

When relay K has closed its make contacts, a circuit is completed for the energization of relay LC, whereupon the anode circuit of the cold cathode tube, the primary circuit of the surge coil, and the circuit rotating the selector, are opened. Relay $Gt$ de-energizes, and by opening circuit (5) causes relay L to energize in series with relay K which is thus held. As soon as relay L is energized, that side of the primary circuit of the surge transformer which was previously connected to brush $a$ of switch S is now switched over to brush $b$ via the left outer make contact of relay L. The terminals of arc $b$ are each connected to a point of the potentiometer the potential of which is $p$ volts less than that characteristic for the corresponding terminal on arc $a$. Thus, terminal 6 on arc $b$ is connected to point 7 of the potentiometer. Further, at the moment relay L opens its left break contact, relay Lc de-energizes and recloses the anode circuit of the cold cathode tube, the primary circuit of the surge transformer, and the circuit for rotating the selector. The sequence of operation of the contacts of relay Lc insures that the primary circuit of the surge transformer is closed only after the anode circuit of the cold cathode tube is reclosed and guards against the application of a surge to the test detector before the cold cathode tube is ready to detect it.

Since we have assumed that the test detector has responded when the selector reached position 51, which is the correct position corresponding to the digit received, then when relay Lc recloses the anode circuit of the cold cathode tube, the primary circuit of the surge transformer and the circuit for rotating the selector, the difference of potential applied to the test detector will be $p$ instead of $2p$. Although this difference of potential has the required direction to influence the detector, it is below the necessary minimum and the test detector does not respond. The selector is thus again set in motion while the test circuit for the detector remains closed via brush $b$ of switch S. The direct current test circuit for choosing a free outlet is prepared as follows:

(6) Ground, left outer break contact of relay M, right outer make contact of relay L, left hand high resistance winding of relay $Jt$, brush and terminal $d$ of LS to brush $d$ of group selector Gs.

To arc $d$ of the selector switch are connected the resistances $r_t$ over which battery is applied to indicate free outlets. As soon as brush $d$ encounters, beginning with terminal 51, a test potential which is not lowered by busy condition, the test relay $Jt$ in the register energizes and stops the rotation of the selector. Relay $Jt$ operates its helping relay H and shunts its high resistance winding for the well known double test. When relay H closes its make contact, the group selection proper is finished and a circuit is prepared for energizing relay C for the receiving of the next digit.

The energization of relay C causes the group selector relay G to operate and switch over the various signaling wires from the register to the group selector brushes over which further selections will be practiced.

*False test*

Assuming the digit 6 has been sent in but that either the test potential is removed from terminal 51 of the selector, or that the selector brush *t* does not make a good contact with terminal 51, then the detector will fail to operate when terminal 51 is encountered, and the selector goes on rotating until it encounters terminal 61, the next one which is connected to point 5 of the potentiometer. The primary circuit of the test transformer is then subjected to a difference of potential exceeding the minimum required for operation and having the correct direction. The detector responds and relay G*t* energizes, causing in turn the operation of relay K, the operation of relay L*c*, the de-energization of G*t*, the operation of L in series with K, and the release of L*c*.

When relays K and L are both energized after the first response of the test detector, the primary circuit of the surge transformer is reconnected between the selector brush *t* and brush *b* of the digit receiving switch. Since the test detector is now subjected to a difference of potential 2*p*, it responds again. Relay G*t* re-energizes thus preventing the selector from rotating before it has even had time to leave position 61 or to effect its direct current test on the free outlet corresponding to position 61. The second closure of the make contact of relay G*t* causes relay M to energize in a manner similar to relay K. As soon as relay M is energized, the primary side of the surge transformer previously connected to brush *a* of the digit switch is now connected to brush *t* of the selector, whereas, the side previously connected to the selector is now connected to point 9 of the potentiometer. While relay M is energized and relay N is still down, relay L*c* operates thus extinguishing the cold cathode tube and releasing relay G*t*. Relay N comes up in series with relay M as soon as relay G*t* has opened its make contact, just as relay L energized in series with relay K. Relay L*c* is released and the test detector is again switched in. The selector, after having been momentarily stopped, is again set in motion and the passage of the selector over all the remaining test potentials in the arc will have no effect on the test detector since, owing to the reversal of the connections to the latter, their direction is opposed to that required. When after a complete rotation, the selector brush t returns to terminal 1 which is connected to point 11 of the potentiometer, then the primary circuit of the surge transformer is subjected to a difference of 2*p* potential in the correct direction to operate it. The energization of relay G*t* again stops the selector and relay K is short-circuited as follows:

(7) Ground, make contact of relay G*t*, right inner contact of relay N, left make contact of relay B, winding of relay K, left inner make contact of relay K, left-hand winding of relay L to ground.

Relay K de-energizes but relays L, M and N remain energized. When relay L is energized and relay K is not operated a circuit is again closed for energizing relay L*c* and the cold cathode tube is extinguished. Relay G*t* de-energizes removing the energizing ground for relay L. Relays L, M and N thus release in turn and the initial conditions are reestablished in the register. The selector is again set in motion and the cycle of operations described above will be repeated until the test detector first responds when the correct position (terminal 51) is reached by the selector, whereupon the remaining operations take place as described for a normal test.

*Continuous hunting*

If we assume, as previously, that digit 6 has been dialed and that the test detector has responded when the selector encountered position 51, then hunting for a free outlet takes place. Should there be no free outlet in the desired group, then the selector will continue until it encounters next test potential wire connected to point 5 of the potentiometer which presents the required difference of 2*p* volts with respect to the potential on brush *b* of switch S. Relays M and N become energized upon this new operation of the test detector.

The conditions in the register are now such that the selector goes on rotating but the test detector remains unaffected until position 1 is reached when a new operation of the test detector causes relays K, L, M and N to release. A new cycle is started and hunting for a free outlet will again take place as soon as the test detector responds when the selector reaches position 51. These operations are repeated until a free outlet is found in the wanted group.

The foregoing applies to the dialing of any digit 1–0, but in connection with digit 0 the following is noted:

Since the stopping position corresponding to digit 0 is the beginning of the last group of outlets in the arcs of the selector, it is necessary to mark the end of this group of outlets by an extra test potential wire in order to maintain the required operation of the register. No error could occur in the numerical selection if this wire were omitted but the end of "free hunting" would not be indicated in case all circuits of the group were busy, and a free outlet might be picked up in a wrong group.

The above example dealing with the group selection of the first selection stage of an automatic exchange is not in any way restrictive, and the system may be applied to any intermediate group selection stage of an exchange designed for more than three-digit dialing. The method of effecting group selection remains the same, the intermediate group selector being controlled direct from the register via brushes of the preceding selectors.

What is claimed is:

1. In a telecommunication system, a switching arrangement comprising at least one stage of group selectors having sets of terminals divided into groups, a set of brushes adapted to hunt over a selected group of terminals for an idle set, and means for moving said brushes over said terminal, a register controller having impulse receiving and storing means for the digits corresponding to the designation of the connection to be established, means for controlling the group selecting operation of said selector from said register controller comprising a signalling circuit linking said set of brushes to said digit storing means, a plurality of sources of direct potential, means for connecting predetermined of said sources to the first and last terminals in each group of terminals to mark the beginning and end of each group, means controlled by said impulse storing means for marking the register controller end of said signalling circuit with potentials from said sources characteristic of the digit stored, a detector in said signalling circuit responsive to a predetermined current flow between said brushes and said impulse storing means, means controlled by said register controller for energizing said brush moving means to initiate the movement of said brushes over said terminals, means controlled by said detector for arresting the energization of said brush moving means so as to stop the brushes on a set of terminals, means responsive to the first operation of said detector for restoring said detector to normal condition so that it may be subsequently operated, means responsive to the restoration to normal of said detector for shifting from the potential characteristic of the stored digit at the register controller end of said signalling circuit to a predetermined check potential insufficient to operate said detector, whereby the means for energizing the brush moving means is again operated to cause said brushes to continue hunting within the group of terminals, means for characteristically marking free selector terminals within the groups, and means controlled by the means for shifting the potential of the stored digit for arresting said brush moving means when the selector has reached a free terminal within the group.

2. The arrangement according to claim 1, and in which the value of all potentials connected at the selector, except that marking the beginning of the groups, and the corresponding potential at the register are of insufficient difference to cause the response of the detector.

3. The arrangement according to claim 1, and in which the value of all potentials connected at the selector, except that marking the beginning of the groups, and the corresponding potential connected at the register, are of sufficient difference to cause a second response of the detector before the selector has left a position, thereby preventing the operation of the brush moving means.

4. The arrangement according to claim 1, and in which the magnitude of the potential characterizing the ends of the groups is such that it differs from the check potential at the register after a first response of the detector, by a quantity of sufficient value and correct direction to cause a second response of the detector and thereby prevent the operation of the brush moving means if said selector is unable to find a free set of terminals in a wanted group.

5. The arrangement according to claim 4, further comprising additional means operative upon the second response of the detector for reversing the connections to the detector and for applying to the register end of the signalling circuit a potential producing a third response of the detector, said additional means being under control of the potential switching means, and means operative thereupon for restoring the detector to normal.

6. The arrangement according to claim 1, and in which the potential characteristic of a digit is the check potential for another digit.

7. The system according to claim 1, and in which the selector terminals marking the end of a group also mark the beginning of the next group, except the last.

8. The system according to claim 1, and in which the selector terminal marking the first group of a series, marks also the position where initial conditions must be reestablished after unsuccessful hunting.

9. The system according to claim 1, and in which the selector switch has a home position, further comprising means for connecting the potentials characterizing the numerical indications in the register and the potentials marking the groups in the selector bank in an increasing scale, means for causing said selector to start from the home position before the end of reception of the corresponding numerical indication in the register, and means for delaying the starting after the reception of a digit sufficiently to insure the establishment of said predetermined relationship only after the numerical indication has been completely received in the register.

10. In a telecommunication system, the combination, according to claim 1, in which the detector is a gas discharge valve and the means for arresting the energization of the brush moving means is a relay connected in the discharge circuit of said valve and having contacts controlling the selector brush moving means.

11. In a telecommunication system, the combination, according to claim 1, in which the digit storing means comprises stepping switches having at least two terminal banks with associated wipers, the characteristic potentials being connected to the terminals of one bank and the checking potentials being connected to the terminals of the other bank, and in which the means for shifting from the characteristic potential to the checking potential comprises a relay having transfer contacts to transfer the signalling circuit from one of said wipers to the other.

WILLY POULIART.

REFERENCES CITED

The following references are of record in the file of this patent:

UNITED STATES PATENTS

| Number | Name | Date |
|---|---|---|
| 2,238,223 | Kozma | Apr. 15, 1941 |
| 2,242,776 | Clark | May 20, 1941 |
| 2,351,016 | Deakin | June 13, 1944 |